United States Patent [19]

Rodak

[11] 4,346,653
[45] Aug. 31, 1982

[54] METHOD AND APPARATUS FOR REFUSE DISPOSAL

[75] Inventor: Edward Rodak, York, Pa.

[73] Assignee: General Defense Corporation, Red Lion, Pa.

[21] Appl. No.: 123,705

[22] Filed: Feb. 22, 1980

[51] Int. Cl.³ .................. B30B 9/04; B30B 13/00
[52] U.S. Cl. ............................ 100/37; 100/73; 100/43; 100/116; 100/215; 100/249
[58] Field of Search .......... 100/70 R, 73, 74, 75, 100/35, 37, 39, 43, 116, 215, 249, 295; 53/527, 436, 431

[56] References Cited

U.S. PATENT DOCUMENTS

| | | | |
|---|---|---|---|
| 3,195,544 | 7/1965 | Taylor | 100/74 |
| 3,330,088 | 7/1967 | Dunlea, Jr. | 53/24 |
| 3,514,969 | 6/1970 | Harza | 100/73 |
| 3,654,048 | 4/1972 | Bathgate | 161/7 |
| 3,721,183 | 3/1973 | Dunlea, Jr. | 100/39 |
| 3,850,094 | 11/1974 | Shontz | 53/527 |
| 3,934,038 | 1/1976 | Kerr | 426/1 |
| 4,002,004 | 1/1977 | Lambert | 100/73 |
| 4,008,658 | 2/1977 | Stock et al. | 53/527 |

FOREIGN PATENT DOCUMENTS 1346262  2/1974  United Kingdom .

OTHER PUBLICATIONS

"Deep Ocean Dumping of Baled Refuse," Sub-Council Report, National Industrial Pollution Control Council, Feb. 1971.

*Primary Examiner*—Peter Feldman
*Attorney, Agent, or Firm*—Pennie & Edmonds

[57] ABSTRACT

A method and apparatus are disclosed for treating refuse preparatory to its discharge in a body of water in which air incorporated in the pores and interstices of the material of the refuse is replaced with a liquid, such as water, sea water, or brine, by applying fluid pressure in the range of 200–300 p.s.i. to the refuse containing an added quantity of the liquid.

39 Claims, 4 Drawing Figures

METHOD AND APPARATUS FOR REFUSE DISPOSAL

BACKGROUND OF THE INVENTION

1. Field of the Invention

This invention relates to the treatment of refuse, particularly the treatment of refuse for disposal at sea. The invention is applicable to the disposal of refuse generated aboard ship, and also to the disposal of refuse generated on land, such as in municipalities. Various studies have indicated that deep sea disposal of refuse may be accomplished without detrimentally affecting the ocean environment, provided the same can be made to go directly to the bottom of the sea and stay there. A slow degradation of such refuse takes place, and the organic materials can again enter the ecological chain without damage. The difficulty has been to insure that the refuse is delivered promptly to the bottom and that it remains there.

2. Prior Art

The term "refuse" as used herein and as generally understood means any solid wastes other than sewage. Studies have shown that solid wastes collected in typical urban areas comprise approximately 45% paper products, 20% food wastes, 9% metals, 9% glass and ceramics, and 1.5% plastics, with the remainder being principally garden wastes, wood and ashes. Solid wastes generated aboard ship would be expected to be somewhat similar, with perhaps a lower content of metals, no garden wastes or ashes and a high proportion of food wastes. The present method is useful on any mix of solid wastes so long as it includes some quantity of fibrous or porous material which incorporate air in its physical structure. Such materials incorporating air (hereinafter called "porous components") include, for example, wood, paper products and food wastes.

Efforts have been made to dispose of refuse generated aboard ships by compacting it into bales, which are then dumped into the sea. These efforts have been directed largely at achieving higher compaction densities. However, constraints imposed by equipment and energy costs have limited the degree of compaction achievable. As a result, even the highest densities achieved have not proved adequate to reliably insure that the bales go promptly to the bottom. Moreover, such bales must usually be bound with straps or other bindings to hold them together adding materially to the cost of disposal. Even then, particles and larger portions can break free and float on the surface. To avoid such flotsam, partly for security reasons, submarines conventionally carry billets of lead which are inserted in compacted and containerized refuse prior to disposal in order to guarantee that the bale goes promptly to the bottom and stays there.

Apart from shipboard refuse disposal, it has long been recognized that the deep ocean is a viable place to dump municipal wastes if they can be properly prepared and processed so as not to damage the marine or shore environment, see, "Deep Ocean Dumping of Baled Refuse", Sub-Council Report, February, 1971, National Industrial Pollution Control Council, prepared for the United States Department of Commerce. This report recognized that " . . . municipal refuse offers the possibility of packaging into compressed bales which can be deposited in specific selected sites in the deep oceans where biological activity is minimal. Possible pollution hazards in such a disposal system include the floating of components of refuse during the dumping operation or their refloating at a later date, and unacceptable interference with the biological system of the ocean. A properly designed series of experiments could develop acceptable methods for the disposal of municipal refuse in the oceans. The United States, with its pressing municipal refuse disposal problems, should initiate such experiments," p.6. The report advocated baling the refuse to prevent re-floating, i.e. binding it up in bundles which " . . . may have to be securely wrapped in a water penetrable plastic . . . ," p.11. It further recognized that "compacted municipal refuse becomes almost totally impregnated with water and reaches maximum density after a few minutes at a hydrostatic pressure equivalent to a depth of 500–600 feet. Most materials become more dense than water after water impregnation induced by the hydrostatic pressure. These include paper and wood but exclude certain plastics, particularly polyethylene, which make up only 1% to 2% of municipal wastes. This means that baled refuse will sink and, if properly bound together, will stay down. It will not float," p.11. Accordingly, the report recommended a pilot program in which refuse would be " . . . compressed, baled and packaged," and deposited 250 miles at sea. While baled refuse may stay down once exposed to 500-foot depths, however, baling has not been capable of reliably sinking it to that depth; the problem of floating refuse still remains.

Some methods proposed for treating refuse employ binders when compacting, in order to hold the mass together. Proposed as binders for the refuse have been such materials as asphaltum, suggested in U.S. Pat. No. 3,721,183, bitumen, suggested in U.S. Pat. No. 3,654,048, and even water, suggested in U.S. Pat. No. 3,195,447. (Water does not really "bind" the refuse in the sense of bonding it together; the patent apparently refers to the effect of water in allowing the mass to compact more densely.) U.S. Pat. No. 3,934,038 contains a different suggestion, that the refuse be separated into components according to density, and that the components more dense than sea water be sprayed with an organic material as a feed for microorganisms. The spraying is applied both to the shredded refuse and to the compacted bale.

Efforts have also been made to encase the bale to prevent flotsam from breaking away, see for example, U.S. Pat. No. 3,330,088. On the whole, all of these methods have sought to rely upon relatively high pressures to compact the bale to a density sufficient to achieve negative buoyancy, and upon additives to increase weight, cohesiveness and biodegradability, often at material additional cost. Despite these and other efforts at significant cost to achieve a practical method for refuse disposal at sea, it has thus far been impossible, as reflected in published literature, to insure that the entire bale will reliably sink. Despite the fact that almost all refuse is made up of materials which are intrinsically denser (in their chemical makeup) than sea water, the problem of floating bales and particles broken from bales persists.

BRIEF SUMMARY OF THE INVENTION

This invention is based upon applicant's discovery that refuse may be made to reliably sink in water by subjecting it, preferably (but not necessarily) prior to compaction, to hydrostatic pressure adequate to displace the air trapped in the interstices of porous constituents such as wood, wood products and garbage, with water or other liquids capable of entering such interstices. Most refuse components are porous to some extent in that they contain minute interconnected cells formed by a rigid interlocking fibrous structure. It is these cells, which usually contain air, that render the material buoyant. Compaction reduces the total interstitial volume (and hence buoyancy) by deforming the fibrous structure of the material. However, the fibers have a "memory", tending to return to their original form upon release of compaction pressure. The interstices also tend to re-expand, breathing in air in the process. Some interstices are large, open cells, easily wetted. Others are accessible only through narrow channels that resist wetting except at high pressures. These pressures are dependent mainly upon the size of the channels and the surface tension of the liquid, 200–300 p.s.i. being adequate for most natural fibrous materials where the liquid is water.

Preferably, the refuse is then subjected to compaction, forming it into a dense slug for ease of handling and disposal. Since virtually all of most refuse mixtures will sink promptly after impregnation in accordance with the invention, there is relatively little need to rely on containerization. It has been found that by displacing a sufficient amount of the air incorporated in the porous refuse with even fresh water, it is possible to insure that the refuse will sink promptly in sea water. This result is achieved even though sea water is denser than fresh water due to the fact that the material itself is actually denser than sea water, but is being buoyed up by the considerable quantity of minute pockets of incorporated air. Air has a density of approximately 0.08 pounds per cubic foot, while even plain water is approximately 800 times heavier.

It is preferable to shred most refuse mixtures prior to impregnation and compaction to achieve greater compaction densities and a more uniform distribution of material within the compacted slug. The liquid used also enhances mechanical compaction by acting as a lubricant for the refuse, permitting greater compaction densities than with dry refuse, see e.g. U.S. Pat. No. 3,654,048, col.2, lines.14–19, noting that the compacted mass is denser than can be explained by the added weight of the water. Treated in accordance with the invention, not only is there a density increase due to added lubricity among the refuse particles, but each particle may be more densely compacted due to the water's lubricating effect on the individual fibers of its structure.

Any liquid may be used in accordance with the invention which is low enough in viscosity and surface tension to displace interstitial air in the refuse at the pressures employed. Whether or not a particular liquid is suitable can readily be determined empirically, noting the density of the resulting refuse to see if the liquid has been adequately stored in the interstices.

While plain water will work in practicing the invention, it is preferred to use sea water, particularly when disposing of onboard refuse, because of its ready availability. Even more preferable is a brine having a salt content of about 10% or more by weight, since such brines are excellent bactericides, particularly for aerobic bacteria. This is important where the treated refuse is to be stored for any length of time prior to disposal for bacterial action rapidly generates foul smelling gases. While attempts have been made to use salt as a bactericide for refuse, it is believed that no method of application assured even enough distribution to inhibit bacterial action since such action could take place in any small volumes where the salt was not present. The present method assures the necessary even distribution. Shipboard evaporators can be used to obtain such brines from available seawater. Also, by treating with brine, the impregnated refuse may be stored in an unsealed condition for an appreciable length of time, both because it is bactericidal and because the salt stored in the interstices of the refuse, by virtue of its own weight and because it is hygroscopic and thus tends to retain the water therein against evaporation, maintains the negative buoyancy of the compacted refuse. After disposal, the brine equilibrates to the salinity of its environment, permitting bacterial decomposition to gradually return the organic constituents of the refuse to the ecological cycle.

In carrying out the method of the invention, the refuse, after an initial optional shredding step, is fed into a chamber capable of being sealed substantially air-tight. In the chamber, the refuse is supplied with an excess of liquid and subjected to a fluid pressure. Enough liquid is present so that the applied fluid pressure is distributed over all particles of the refuse. In a preferred embodiment, the fluid pressure is applied to the liquid by a ram fitted to form an air-tight seal within the chamber. As the ram progresses downwardly, there is first an air bubble entrapped next to the face of the ram. Beneath this air bubble is the applied liquid and the refuse. Downward movement of the ram causes the entrapped air bubble to apply a fluid (in this case pneumatic) pressure on the underlying liquid. Thus, in turn, causes the liquid to apply a fluid (in this case hydraulic) pressure on the refuse. This hydraulic pressure drives the liquid into the pores and interstices of the material and, thus, drives the air out with a consequent impregnation of the refuse material by the liquid being used. A relief valve is provided in the ram face which opens at a predetermined pressure, preferably between 200 and 300 p.s.i, to release the displaced air and any excess liquid from the refuse being treated. It is not essential to release the trapped air to achieve sufficient hydraulic pressure, and once the interstitial air has been displaced by the liquid, it will remain mechanically trapped in the pores and interstices until it eventually evaporates.

Application of the ram is preferably continued to mechanically compact the refuse to a conveniently handlable slug. Displacement of the interstitial air should preferably be achieved before significant mechanical deformation of the refuse into a slug because such deformation tends to narrow the pores and interstices, requiring a higher pressure to force the liquid into them, sometimes higher than it is practical to achieve with available hydraulic or other driving equipment. Initially, during this continued application of pressure, there may be some continuing displacement of air with the liquid, which air and any excess liquid will continue to be removed from the face of the ram by virtue of the relief valve provided. Essentially, however, this continued pressure of the ram constitutes a mechanical pressure for the purpose of compacting the material for easy disposal. It is preferred to compact the material into a slug since it may be more easily handled in this manner and in order to get rid of excess water that would otherwise pose a housekeeping problem.

Heretofore, compaction, even of refuse that had been sprayed with water, has not resulted in impregnation and substantial removal of interstitial air and, thus, negative buoyancy could not be consistently insured. The apparatus disclosed in U.S. Pat. No. 3,934,038, for example, adds only sufficient liquid to "... coat a substantial portion of the individual particles of trash with an organic film," col.3, lines 5–6. If sufficient liquid were present to apply a fluid pressure to the refuse as set forth herein, then plainly the trash could not be compacted by the apparatus disclosed (FIG. 1(a)) since no means is shown or suggested for relieving the fluid pressure to allow such compaction.

Once the liquid has been impregnated into the pores and interstices, the slug may be stored without covering and the water will not escape (other than by evaporation) due to the surface tension of the liquid. If salt water or brine is the impregnating material, even this evaporation does not generally destroy the negative buoyancy of the refuse since it leaves behind salt crystals of considerable density which, together with the water retained by the hygroscopic salt, insure the negative buoyancy of the material and the slug.

DETAILED DESCRIPTION OF THE INVENTION

Preferred Embodiments of the Invention

Figure 1:
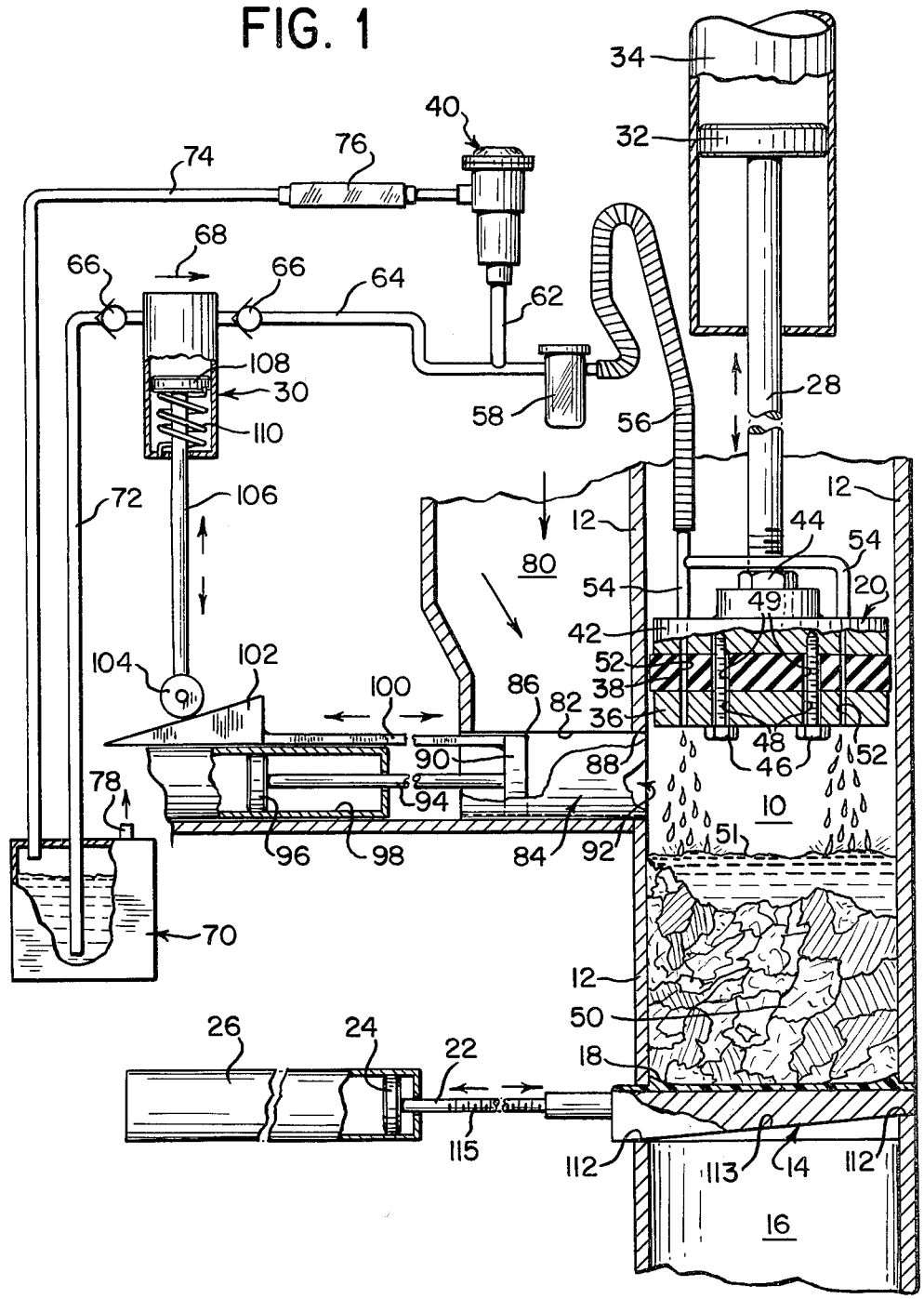
FIG. 1 is a diagrammatic representation of an apparatus suitable for carrying out the invention.

As shown in FIG. 1, the apparatus of the first embodiment comprises a refuse receiving and compaction chamber 10 defined by walls 12 and having any convenient cross-section, such as circular, square, or the like. The compaction chamber 10 is closed at the bottom by a bulkhead 14 which is an ejection chute 16 for ejection of the compacted and impregnated slug. The bulkhead 14 has on its upper surface a layer 18 of an elastomeric material in order to seal the same against the lower edges of the walls 12. The bulkhead 14 is further connected by a piston rod 22 to a piston 24 operating within a cylinder 26. The piston-cylinder 24, 26 may be either pneumatic or hydraulic, preferably the latter. Alternatively, any mechanism capable of producing the requisite force may be used. Operation of the piston-cylinder 24, 26 serves to move the bulkhead 14 from its operative position shown in FIG. 1 to a retracted position (to the left as viewed in FIG. 1) and vice versa. In the retracted position, the bulkhead 14 fully opens the chute 16 for ejection of the ejected slug of refuse.

Because it is preferable to have a substantially airtight sealing of the compaction chamber 10, the bulkhead 14 is provided with an elastomeric material 18 which deforms and flows under pressure such that its edges seal tightly against the lower edges of the walls 12. The compacted trash also aids in sealing the chamber to achieve the necessary impregnation pressures. To promote adequate air-tight sealing, the bulkhead 14 may be made slightly wedge-shaped, as shown, and operate within suitably shaped and dimensioned openings 112 in the walls 12 along sloped tracks 113. With this arrangement, the further the piston-cylinder 24, 26 moves the bulkhead 14 to the right in FIG. 1, the tighter its upper surface seals against the lower edges of the walls 12. Rod 22 may comprise two threaded parts, as shown at 115, in order to adjust for any wear of seal 18.

A ram generally indicated at 20 is caused to operate within the compaction chamber 10 by a piston rod 28, which in turn is connected to a piston 32 operating within cylinder 34. The ram 20 comprises three layers 36, 38 and 42. The steel backing plate 42 of ram 20 may be secured to the free end of piston rod 28 by any suitable means, such as a threaded bore, and locked thereto by means of a nut 44. A metal face plate 36 is secured to backing plate 42 with an elastomeric layer 38 therebetween. Face plate 36 is so secured to backing plate 42 as to be movable toward and away from the backing plate 42. This mounting may comprise bolts 46 passing loosely through holes 48 in face plate 36 and also loosely through holes 49 in elastomeric layer 38. In this way, when the ram is moved downwardly, the face plate 36 first contacts the refuse 50 or the liquid level 51 and is pressed upwardly against elastomeric layer 38 by virtue of the fact that face plate 36 can move upwardly along bolts 46. Further operation of the ram causes the elastomeric material 38 to bulge outwardly, tightly sealing against the inner surface of walls 12 to achieve a substantially airtight seal. Elastomeric member 38 in ram 20 and sealing layer 18 on bulkhead 14 may be any elastomeric material of a type and thickness which will deform and flow under pressure sufficiently to provide adequate sealing under the opeating conditions of the apparatus. One such material which has been found to work successfully is a polyurethane elastomer sold as "Type Light Grade 72 Shore A ELASTOCAST", sold by the Achushnet Process Company of New Bedford, Mass. A one-half inch thickness of the ELASTOCAST product, for layer 38 has been found satisfactory in the ram and a one-quarter inch thickness for the layer 18 (preferably with a fabric backing to facilitate bonding to the bulkhead) works well when adhered to bulkhead 14. Any adhesive may be used to adhere layer 18 to bulkhead 14, which will successfully bond both to the elastomer 18 and the metal of bulkhead 14. One product that has been found useful in conjunction with the ELASTOCAST is a universal adhesive sold under the trademark PLIOBOND, available from Goodyear Tire and Rubber Co., 1144T, East Market Street, Akron, Ohio.

One or more passageways 52 (two being shown in FIG. 1) are provided and extend completely through ram 20 including face plate 36, elastomeric layer 38 and backing plate 42. These passageways 52 are connected by suitable conduits 54 to a single flexible conduit 56, in turn connected to strainer 58. Strainer 58 is connected to pressure relief valve 40 through conduit 62 and to liquid injection pump 30 by means of conduit 64. One-way valves 66 on either side of the liquid injection pump 30 insure that liquid flows only in the direction of arrow 68. The liquid injection pump 30 is connected through one-way valve 66 and conduit 72 to a liquid storage reservoir 70. Pressure relief valve 40 is also connected to liquid storage reservoir 70 by means of a conduit 74 having a portion 76 thereof that is transparent in order to permit an operator to view any flow therethrough. The liquid storage reservoir 70 is vented to the atmosphere at 78.

A hopper 80 is provided for receipt of loose refuse. Hopper 80 has an open bottom 82 providing communication from the hopper to charging conduit 84. Mounted for reciprocation within the charging conduit 84 is a piston in the form of shear plate 90 positioned to cooperate with the upper edge 88 of an opening 92 extending through wall 12. Opening 92 provides communication between charging conduit 84 and compaction chamber 10. Shear plate 90 is connected by piston rod 94 to a piston 96 operating within cylinder 98. Secured to shear plate 90 is a closure plate 100 which, upon operation of shear plate 90 to the right as viewed in FIG. 1, will close off the bottom of hopper 80. During this movement, shear plate 90 charges compaction chamber 10 as it cuts larger pieces of refuse between its edge 86 and fixed edge 88. Upon retraction of shear plate 90 (to the left in FIG. 1), closure plate 100 again opens hopper 80 to communication with charging conduit 84 so that additional refuse may fall into charging conduit 84. Several strokes of piston-cylinder 96, 98 and several reciprocations of shear plate 90 will generally be required to empty one charge into hopper 80, after which piston-cylinder 32, 34 is operated to execute a compression stroke of ram 20, as will be more fully described hereinafter.

Upon each retraction of shear plate 90 to the left, as viewed in FIG. 1, liquid injection pump 30 is operated to inject liquid from reservoir 70 through conduits 64, 56, 54 and 52 into compaction chamber 10, so that the refuse is thoroughly wetted prior to compaction. The liquid injection pump 30 comprises a high pressure single stroke piston pump with spring return and may be connected by any suitable mechanical means to be operated by piston-cylinder 96, 98. Illustrated in FIG. 1, merely by way of example, is a wedge-shaped cam 102 cooperating with follower roller 104 mounted for rotation at the bottom end of piston rod 106 connected to piston 108 in the injection pump 30. Upon retraction of the shear plate 90 by the piston-cylinder 96, 98, cam 102 which is connected to the closure plate 100, will be moved to the left effecting upward movement of the rod 106 and the piston 108 for injection of the liquid into compaction chamber 10. When the piston-cylinder 96, 98 moves the shear plate 90 to the right, a spring 110 causes piston 108 and piston rod 106 to move downwardly maintaining roller 104 in contact with the cam 102, which movement draws the next charge of liquid into the injection pump 30 from reservoir 70 through conduit 72.

The various piston-cylinder systems may be operated either pneumatically or hydraulically, with hydraulic operation preferred. A suitable source of hydraulic fluid, means for pressurizing the hydraulic fluid, conduits, valves, and the like, are provided to operate the three hydraulic piston-cylinder systems 24, 26, 32, 34 and 94, 96. All of the same are conventional and any one skilled in the art would be able to construct the same; accordingly, such equipment is not shown in the drawings. The manner in which the device must operate and its sequence is described below. Also, the amount of liquid injected by the pump 30 with each stroke is adjustable. Any suitable means for adjusting this quantity may be provided, including replacing the cam 102 with another cam having a different slope in order to change the length of the stroke of the piston 108. Alternatively, the piston rod 106 can be made so that its length may be adjustable. Other means of adjustment will occur to those skilled in the art. The amount of injected liquid is not critical as long as there is some excess to insure uniform fluid pressure within the compaction chamber.

While an air-tight seal in the compaction chamber is preferred, as described, it is not essential to practicing the method of the invention. Leakage of liquid from the compaction chamber is acceptable provided that sufficient hydrostatic pressure can be developed in the compaction chamber long enough to achieve impregnation, before the liquid leaks from the chamber. The refuse itself has a sealing effect, reducing such leakage.

SECOND EMBODIMENT OF THE APPARATUS

Figure 2:
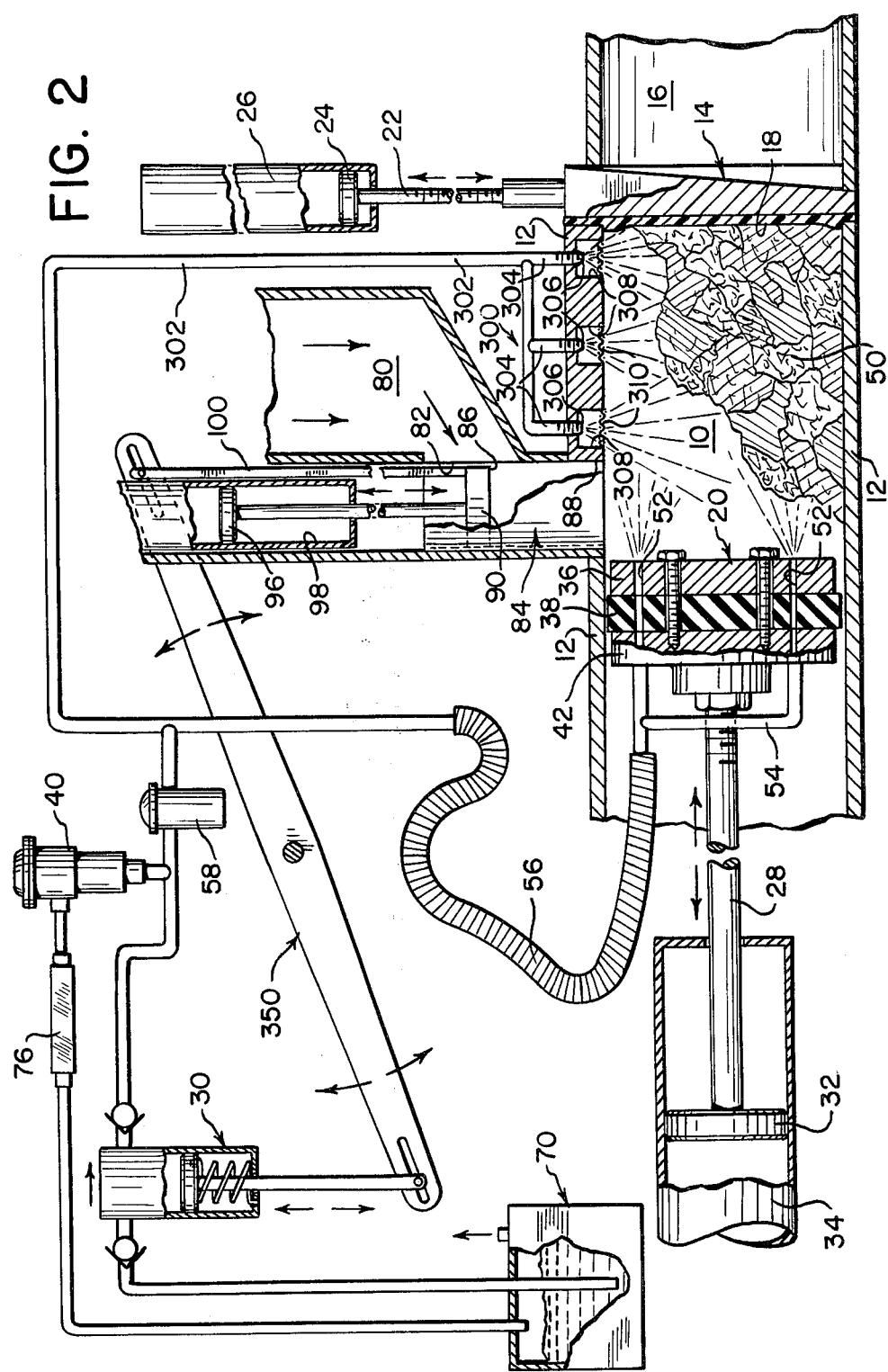
FIG. 2 is a diagrammatic representation of a second embodiment of the apparatus.

Shown in FIG. 2 is a modification of the apparatus of FIG. 1, which parts corresponding to FIG. 1 are indicated with the same reference numberals. The primary difference between the apparatus shown in FIG. 2 and that of FIG. 1 is that ram 20 is arranged horizontally to operate within compaction chamber 10, which is thus also positioned horizontally. Correspondingly, shear plate 90 and its associated piston-cylinder 96, 98 operates vertically rather than horizontally as in FIG. 1, although, as will be apparent, the shear plate and its driving mechanism could be turned 90° in the plane perpendicular to the page and thus also be arranged horizontally.

Moreover, pump 30 is shown in FIG. 2 as being operated from closure plate 100 by means of a centrally pivoted lever 350. This arrangement is intended to be merely illustrative and any of numerous mechanical, hydraulic or electrical connections can be used to operate pump 30 from piston-cylinder 96, 98.

As in FIG. 1, compaction chamber 10 can be of any suitable cross-section, such as circular or polygonal. When arranged horizontally as in FIG. 2, if the chamber is of polygonal cross-section, it should preferably be arranged with one of the apices of the polygon uppermost.

The primary difference in the apparatus of FIG. 2 is the inclusion of a spray manifold 300 for injecting liquid into compaction chamber 10 in addition to liquid passageway 52 which passes through ram 20. Manifold 300 is connected by conduit 302 to filter 58 to which flexible pipe 56 for liquid passageway 52 is also connected. Manifold 300 is also connected to a plurality of short stub conduits 304 terminating in spray heads 306, which themselves terminate in slight recesses 308 in wall 12. Recesses 308 may include screens 310 positioned in the plane of the inner surface of wall 12. Nozzles 306 are arranged along the uppermost point of wall 12 of compaction chamber 10. The number of nozzles 306 and their spacing along the upper wall will depend upon the size of each charge that is compacted and the number of charges which the machine is designed to form into a single slug. At least one nozzle 306 should be spaced to always provide liquid to the newly charged material with at least one nozzle 306 preferably being positioned to be close to but not covered by the previously charged and compacted refuse.

METHOD OF OPERATION

The operation of the apparatus of FIGS. 1 and 2 are essentially the same. For that reason the following discussion of the method of operation is for convenience directed only to the apparatus of FIG. 1. It will be appreciated that the liquid injection pump 30 of FIG. 2 will be operated in a manner similar to and in the same sequence as the liquid injection pump 30 of FIG. 1, but that in the FIG. 2 apparatus, liquid is injected both through the ram passageway 52 and through manifold 200 and nozzles 206.

When it is desired to treat refuse, hopper 80 is charged with a quantity of refuse. At this time, shear plate 90 will be at its extreme right-hand position as viewed in FIG. 1, with the plate 100 closing the bottom of the hopper. Thereupon, piston-cylinder 94, 96 is activated to retract plate 100 and shear plate 90 toward the left. This operation serves to move piston 108 of the liquid injector 30 upwardly, thus charging a quantity of liquid to the compaction chamber 10 if any remains from the previous use. The piston-cylinder 94, 96 is operated a plurality of times to shear and break the refuse into smaller sizes by virtue of the cooperation of cutting edge 86 on shear plate 90, and cutting edge 88. Thus cut into pieces, the refuse is charged to compaction chamber 10 on each forward stroke of shear plate 90. Also, during this forward stroke, liquid injector piston 108 draws an additional quantity of liquid from reservoir 70. On the retraction stroke of shear plate 90, piston 108 will then charge an additional quantity of liquid into compaction chamber 10. This reciprocation of the shear plate is repeated until the quantity of material charged to the hopper has been sheared into smaller pieces and charged to the compaction chamber. The quantity involved will depend upon the size of the machine and may conveniently be from 6 to 15 or 20 pounds or more. After all of the material from the hopper has been charged to the compaction chamber, piston-cylinder 32, 34 is operated to drive ram 20 downwardly against the refuse. At first, air becomes trapped between face plate 36 and the liquid level and then face plate 36 comes into contact with the liquid level 51 and any material extending above that level. The air is trapped due to the fact that when plate 36 descends and contacts air liquid or portions of the material, it moves slightly upwardly along bolts 46 causing elastomeric member 38 to bulge outwardly and seal air-tight against the walls of the compaction chamber. Preferably, the elastomeric member is made wide enough to seal lightly against the chamber walls prior to contacting the material in the chamber in order to limit any extrusion of refuse up past the ram. Further downward movement of the ram 20 causes some additional compression of the air, which exerts a fluid (pneumatic) pressure against the liquid beneath the trapped air. This in turn causes the liquid to apply a fluid (hydraulic) pressure on each particle of the refuse, effecting a displacement of the air incorporated in the material of the refuse with the supplied liquid. When the pressure at the ram face reaches the preset value established by pressure relief valve 40, the valve will open, permitting the air to be evacuated through openings 52, conduits 54, 56, strainer 58, conduit 62, and relief valve 40. From relief valve 40 the air passes through conduit 74 to reservoir 70 and is ultimately vented to the atmosphere at 78. It is preferred to operate in the range from about 200–300 p.s.i., with the range of 250–300 p.s.i. being particularly preferred. As the ram continues downwardly, the ram face contacts the liquid supplied and, thus, a hydraulic pressure is applied throughout the chamber. At any time that the pressure exceeds the value set in the pressure relief valve, liquid and/or air will be discharged through openings 52 and back into the reservoir 70. This hydraulic pressure continues to drive the incorporated air out of the interstices and pores of the material, replacing it with liquid. The air finds its way to the ram face where it is passed through the venting circuit to the atmosphere along with the water through conduits 52 and relief valve 40.

The amount of liquid utilized is determined empirically since the nature of the refuse can vary widely. Much more liquid is required to treat paper than for certain garbage, for example. In accordance with the invention, enough liquid must be provided to assure substantially even fluid pressure on all of the refuse particles. This is achieved in the embodiments disclosed by assuring an excess of the liquid. The operator adjusts pump 30 to add enough liquid to the compaction chamber 10 during charging to insure a significant back-flow of liquid during the compaction stroke, which he can view through clear section 76 of conduit 74. Alternatively, automatic sensing and adjustment can be provided as will be apparent to those familiar with this art. This excess of liquid supplied assures that an adequate amount is provided to saturate all the material present in the chamber and to asure even liquid pressure throughout the chamber. All excess is returned through the conduits to reservoir 70. The strainer 58 is provided since there will be a tendency for some refuse to be carried with the air and excess liquid. Strainer 58 traps this material, protecting the pressure relief valve. Upon each charging of liquid from pump 30 into the compaction chamber, the material trapped by strainer 58 will be re-injected into the compaction chamber.

During its stroke, then, the ram displaces and causes venting of trapped air and water above a pre-set pressure, displaces air trapped in the interstices of the refuse and between the pieces of refuse, and compacts the refuse itself into a smaller volume, or slug. The ram is then returned to the position shown in FIG. 1, another quantity of refuse charged to the hopper and the process repeated until a slug substantially the size of the compaction chamber has been formed. The size of the slug will thus depend upon the size of the machine. In one application, it is anticipated that it will be about three-fourths of a cubic foot in size. The finished slug is rather soggy but contains essentially no free liquid. The quantity of liquid, as mentioned, will vary but it has been found that in one fairly typical batch of refuse, the final slug weighed 50–60 pounds with anywhere from 15–25% of that weight being added liquid (plain water in this case). The slug produced is sufficiently coherent to permits its immediate discharge overboard without the need in most instances for straps or containerization.

While not shown, it is contemplated that control and sequencing of the ram and other mechanical elements shown will be achieved with standard electrohydraulic components such as pressure switches and mechanical limit switches. Such components and their interconnection and use to achieve the method of operation as described herein are disclosed in published literature and are known to those of ordinary skill in the art. Similarly, the hydraulic components shown may be substituted by electrically or electro-mechanically driven components; e.g. pump 30 in FIG. 1 may be electrically driven rather than cam-actuated, as will be apparent to those skilled in this art.

ALTERNATIVE EMBODIMENT OF THE INVENTION

For those ships that spend most of their time at sea where the water is deep, the slug produced by the above described method is satisfactory. In other instances, however, it may be necessary to hold the slugs for later discharge in the ocean depths. The Coast Guard, for example, operates largely in relatively shallow coastal waters. To avoid possible pollution at shallow depths and because discharge of refuse in coastal waters is or may become illegal, it is preferable to store the slugs of compacted refuse on board until a run is made to deeper water where the slugs can be discharged. Moreover, refuse generated on land will require that it be stored for a time until transported to the deep ocean. For these applications, it may be preferable to compact the refuse in a suitable container, such as is schematically illustrated in FIG. 3.

Figure 3:
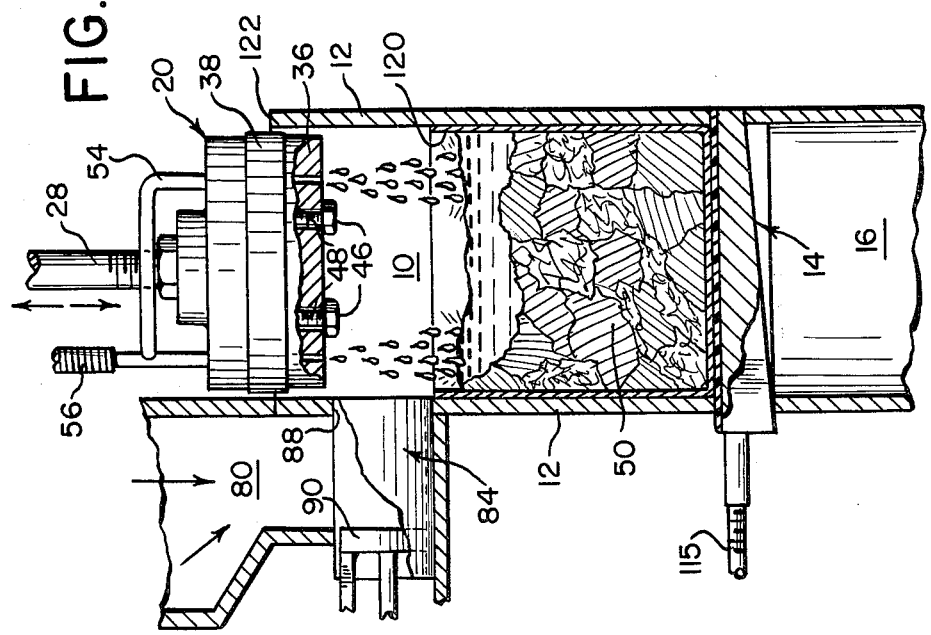
FIG. 3 is a diagramatic representation of a portion of the apparatus of FIG. 1 performing a second embodiment of the method of the invention.

FIG. 3 shows a portion of the apparatus of FIG. 1 in which a metal container 120 is first provided in compaction chamber 10. In order to insert this container 120, ram 20 can be made to lift sufficiently free of the wall 12 and its top edge 122 as to permit the container 120 to be first inserted in the compaction chamber over the edge 122. The container 120 is designed to fit snugly against the walls of the compaction chamber. Container 120 may be of very thin, even flexible, material since it is backed up by the strong rigid walls 12 of compaction chamber 10. A steel contaier of a thickness of 30 gauge has been found suitable. In this system, the method is essentially the same in that the material is first charged to hopper 80, cut by shear plate 90 and charged into container 120 together with a quantity of liquid, after which ram 20 descends. In this instance, the outward bulging of elastomeric layer 38 causes it to seal against the inner surface of the walls of container 120. After the container has been filled, it is then removed from the compaction chamber and stored for subsequent disposal at sea.

In order to prevent evaporation of the applied liquid, the container may be covered. One method of covering it is to pour a suitable sealant material on top of the compacted refuse in the container, which material hardens after pouring. This will insure an air-tight seal at the top without entrapping any air beneath the hardened, poured material. Preferably, this pourable material should degrade and deteriorate after brief exposure to sea water. Examples of materials useful for this purpose are ester gums and animal glues treated so as not to attract vermin or insects. Alternatively, a thin cover, such as an adhesive-backed aluminum foil, may be applied to the top of the container. Since this will tend to trap air at the top of the refuse in the container 120, the top may require puncturing before discharging in the ocean in order to insure that the slug and its container sink promptly. In those instances where the quantity of air trapped is not sufficient to float the container and slug, no puncturing of the lid would be necessary. However, to insure prompt and reliable sinking, puncturing of such a lid is preferred.

As mentioned above, the liquid used with the method of this invention, whether or not a container is employed, may be any liquid with low enough surface tension to impregnate the porous refuse components at the pressures employed, including water, sea water, brine (preferably of at least about 10% by weight of salt) or other appropriate and available liquids. Any of these liquids will insure that the slug sinks due to displacement of air by the liquid in the pores and interstices of the material. The advantage of using sea water is its ready availability at low cost. The advantage is using a 10% brine is that it is bactericidal and is, therefore, particularly advantageous if the slug is to be stored for a time. The impregnation method of the invention assures adequate dispersal of the salt throughout the treated refuse to inhibit bacterial growth. Also, in accordance with the invention, refuse containing disease vectors, such as that from hospitals, may be impregnated with water or brine containing in addition appropriate germicidal agents active against those particular vectors. The present practice for such refuse is to treat it in an autoclave prior to disposal, which is expensive. The ability of the present method to assure even dispersion of the germicide throughout the refuse makes such autoclaving unnecessary.

SECOND ALTERNATIVE EMBODIMENT OF THE INVENTION

Figure 4:
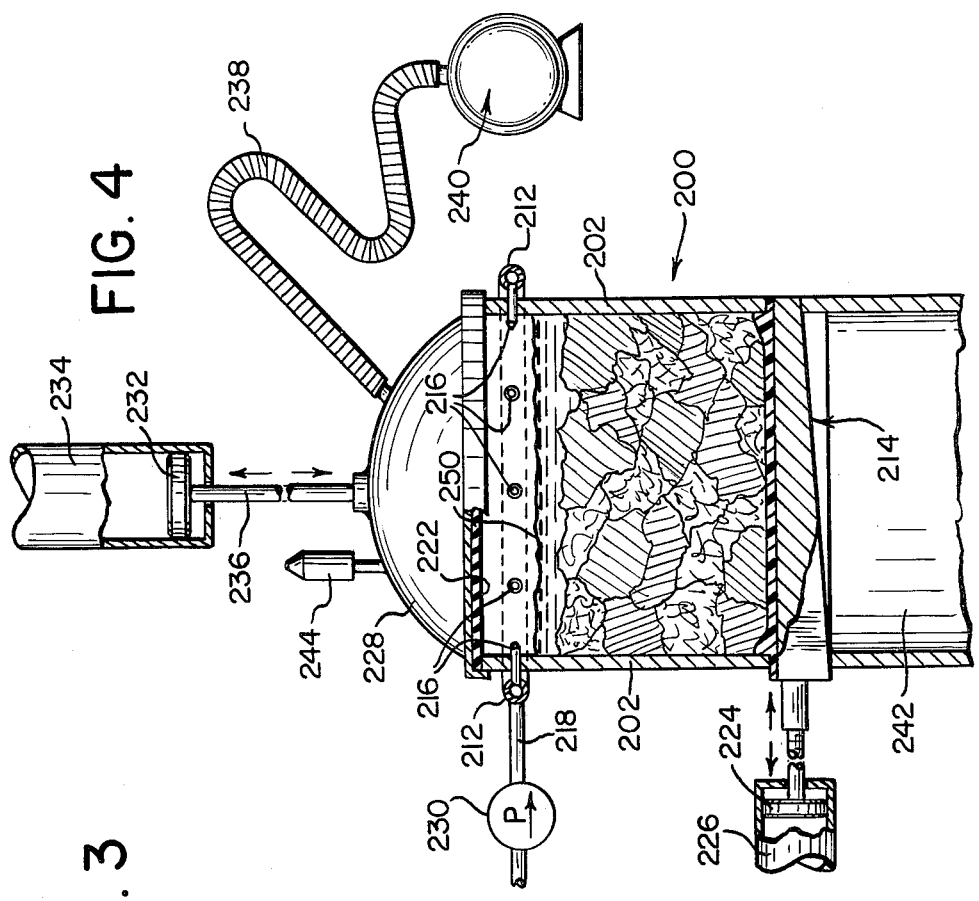
FIG. 4 is a diagrammatic representation of a third embodiment of apparatus suitable for carrying out the method of the invention.

FIG. 4 shows a different apparatus 200 suitable for impregnating refuse with a liquid to displace the air incorporated in the pores and interstices of the material. The apparatus includes a tank 202, having an opening at its bottom that is closed by bulkhead 214 operated by piston-cylinder arrangement 224, 226 in the same manner as bulkhead 14 in FIG. 1. Around its upper end, tank 202 has a manifold 212 with a plurality of nozzles 216 extending through the tank wall. Manifold 212 is connected by conduit 218 to an injection pump 230 for supplying liquid to the refuse in the container. At its top, container 202 has a gasket 222 upon which rests a cover 228 connected to piston-cylinder arrangement 232, 234 by piston rod 236. Connected to the cover 228 is a conduit 238 which supplies compressed air through cover 228 to the contents of the tank from a source 240 of compressed air. Beneath bulkhead 214 is a chute 242 which, preferably, terminates overboard in order to discharge directly into the ocean.

In operating the apparatus of FIG. 4, piston-cylinder 232, 236 is operated to lift cover 228 and piston-cylinder 224, 226 is operated to position bulkhead 214 in the closed position shown. A quantity of refuse, cut to size or not, is then charged to the tank. At the same time, injection pump 230 is operated to supply liquid from a reservoir, not shown, through manifold 212 and nozzles 216 into tank 202. An excess of liquid is charged until the refuse is awash with the liquid and injection pump 230 is then stopped. The piston-cylinder 232, 234 is operated to lower the cover 228 and to seal the same firmly in place on top of the tank 202. The source of compressed air 240 (such as a compressor) is then energized to supply compressed air through the conduit 238 and into the cover 228 and tank 202 above the liquid level 250. The pressure of the compressed air should be on the order of 200–300 pounds per square inch and, preferably, between 250–300 pounds per square inch. This pressure is maintained for a time sufficient for impregnation of the pores and interstices of the material with the applied liquid which displaces the air therein. Since this varies with different materials, the time can be best determined empirically. Generally, the period will be short, on the order of a minute or two after full pressure has been achieved. Thereupon, the pressure inside the tank is relieved by pressure relief valve 244 and piston-cylinder 224, 226 is then operated to retract bulkhead 214, whereupon the impregnated refuse together with any excess liquid is discharged to the sea. It will be appreciated that no compacted slug is achieved with this system, but it is particularly suitable for treating large volumes of waste, for example in garbage scows during their run to or at the dumping site.

The method and apparatus of the invention have been found very effective for refuse having a wide range of material contents. The refuse may be all fibrous or porous materials having air incorporated therein or these may be mixed with quantities of dense materials, such as glass, metal and the like, which contain no incorporated air. In either case, the buoyant material is rendered dense and quickly sinks in a body of water.

The terms "pores" and "interstices" have been used interchaneably herein, and a "porous" refuse component is used herein to mean any such components such as wood, wood products and garbage that contain interstitial voids into which liquid may be forced in accordance with the invention. It will be apparent to those skilled in this art that various modifications, substitutions and departures may be made from the preferred embodiments described herein without departing from the scope and spirit of the invention, which is limited only in accordance with the following claims.

I claim:

1. A method of treating refuse including components that are porous and contain trapped air, comprising depositing such refuse in a chamber; supplying sufficient liquid to such chamber to assure substantially even fluid pressure throughout such refuse, which liquid has sufficiently low viscosity and surface tension to be capable of being forced into the pores of such porous components; and applying fluid pressure throughout such liquid adequate to impregnate enough liquid into such pores to increase the density of such porous components to a value greater than that of water.

2. A method of treating refuse as defined in claim 1 including mechanically compacting the refuse into a slug within such chamber.

3. A method of treating refuse as defined in claim 2 including venting such liquid from the chamber and progressively decreasing the volume of the chamber to mechanically compact such refuse into a slug.

4. A method of treating refuse as defined in any one of claims 1-3 in which the fluid pressure is in the range of from about 200-300 p.s.i.

5. A method of treating refuse as defined in any one of claims 1-3 including venting air trapped in such chamber during application of such fluid pressure.

6. A method of treating refuse as defined in any one of claims 1-3 in which such liquid is water.

7. A method of treating refuse as defined in any one of claims 1-3 in which such liquid is sea water.

8. A method of treating refuse as defined in any one of claims 1-3 in which such liquid is brine having a salt content of at least about 10% by weight.

9. A method of treating refuse as defined in any one of claims 1-3 including providing an open container within such chamber and depositing the refuse into the container within such chamber, and ejecting the container with the refuse in it from the chamber upon completion of such treatment.

10. A method of treating refuse as defined in claim 9 including sealing the open surface of the container after treatment of the refuse therein.

11. A method of treating refuse as defined in any one of claims 1-3 wherein such liquid includes at least an effective amount of a germicidal agent, whereby such agent is distributed uniformly throughout the refuse.

12. A method of treating refuse as defined in any one of claims 1-3 including disposing of such treated refuse at sea.

13. Apparatus for treating refuse including components that are porous and contain trapped air comprising means forming a refuse receiving chamber; means for supplying fluid to said chamber and for determining when there is sufficient fluid in the chamber to transmit substantially even fluid pressure throughout such refuse deposited therein; means for raising the fluid pressure within the chamber to apply a substantially uniform fluid pressure throughout refuse deposited therein, such pressure being adequate to impregnate such fluid into the interstices of such porous refuse components for rendering them more dense than water; and means for removing the treated refuse from said chamber.

14. Apparatus for treating refuse comprising means forming a chamber for receiving refuse therein; means for supplying sufficient fluid to said chamber to assure substantially even fluid pressure on all the particles of such refuse; means for applying pressure throughout such fluid upon substantially all refuse contained in said chamber; means for detecting a predetermined level of fluid pressure in the chamber; means responsive to the detecting means for venting such fluid from the chamber after such predetermined level of fluid pressure has been attained therein; and means for mechanically compacting the refuse in the chamber into a slug denser than the initial density of refuse placed in said chamber.

15. Apparatus for treating refuse as defined in either of claims 13 and 14 including a ram operable in said chamber for applying hydraulic pressure to such fluid therein and for compacting refuse therein upon the venting of such fluid from the chamber.

16. Apparatus for treating refuse as defined in claim 15 wherein said ram includes means for sealing the chamber substantially fluid-tight upon the application of fluid pressure within the chamber.

17. Apparatus as defined in claim 16 wherein said chamber includes a closure member disposed substantially opposite the ram for forming a fluid-tight seal with the chamber when placed in a first position and for opening the chamber when placed in a second position to permit ejecting the treated refuse from the chamber upon actuation of the ram.

18. A method of treating refuse as defined in claim 4 including venting air trapped in such chamber during application of such fluid pressure.

19. A method of treating refuse as defined in claim 4 in which such liquid is water.

20. A method of treating refuse as defined in claim 18 in which such liquid is water.

21. A method of treating refuse as defined in claim 4 in which such liquid is sea water.

22. A method of treating refuse as defined in claim 18 in which such liquid is sea water.

23. A method of treating refuse as defined in claim 4 in which such liquid is brine having a salt content of at least about 10% by weight.

24. A method of treating refuse as defined in claim 18 in which such liquid is brine having a salt content of at least about 10% by weight.

25. A method of treating refuse as defined in claim 4 including providing an open container within such chamber and depositing the refuse into the container within such chamber, and ejecting the container with the refuse in it from the chamber upon completion of such treatment.

26. A method of treating refuse as defined in claim 18 including providing an open container within such chamber and depositing the refuse into the container within such chamber, and ejecting the container with the refuse in it from the chamber upon completion of such treatment.

27. A method of treating refuse as defined in claim 20 including providing an open container within such chamber and depositing the refuse into the container within such chamber, and ejecting the container with the refuse in it from the chamber upon completion of such treatment.

28. A method of treating refuse as defined in claim 4 wherein such liquid includes at least an effective amount of a germicidal agent, whereby such agent is distributed uniformly throughout the refuse.

29. A method of treating refuse as defined in claim 18 wherein such liquid includes at least an effective amount of a germicidal agent, whereby such agent is distributed uniformly throughout the refuse.

30. A method of treating refuse as defined in claim 20 wherein such liquid includes at least an effective amount of a germicidal agent, whereby such agent is distributed uniformly throughout the refuse.

31. A method of treating refuse as defined in claim 4 including disposing of such treated refuse at sea.

32. A method of treating refuse as defined in claim 18 including disposing of such treated refuse at sea.

33. A method of treating refuse as defined in claim 20 including disposing of such treated refuse at sea.

34. A method of treating refuse as defined in claim 21 including providing an open container within such chamber and depositing the refuse into the container within such chamber, and ejecting the container with the refuse in it from the chamber upon completion of such treatment.

35. The method of treating refuse as defined in claim 23 including providing an open container within such chamber and depositing the refuse into the container within such chamber, and ejecting the container with the refuse in it from the chamber upon completion of such treatment.

36. The method of treating refuse as defined in claim 21 wherein such liquid includes at least an effective amount of a germicidal agent, whereby such agent is distributed uniformly throughout the refuse.

37. The method of treating refuse as defined in claim 23 wherein such liquid includes at least an effective amount of a germicidal agent, whereby such agent is distributed uniformly throughout the refuse.

38. The method of treating refuse as defined in claim 25 wherein such liquid includes at least an effective amount of a germicidal agent, whereby such agent is distributed uniformly throughout the refuse.

39. A method of treating refuse as defined in claim 38 including sealing the open surface of the container after treatment of the refuse therein.

* * * * *